(12) United States Patent
Abele et al.

(10) Patent No.: US 10,229,482 B2
(45) Date of Patent: Mar. 12, 2019

(54) DEVICE AND METHOD FOR CONSECUTIVELY PROJECTING DIFFERENT PORTIONS OF AN IMAGE

(75) Inventors: Nicolas Abele, Demoret (CH); Lucio Kilcher, Montreux (CH)

(73) Assignee: North Inc., Kitchener, Ontario (CA)

( * ) Notice: Subject to any disclaimer, the term of this patent is extended or adjusted under 35 U.S.C. 154(b) by 0 days.

(21) Appl. No.: 14/240,624

(22) PCT Filed: Aug. 31, 2011

(86) PCT No.: PCT/EP2011/064953
§ 371 (c)(1),
(2), (4) Date: Feb. 24, 2014

(87) PCT Pub. No.: WO2013/029667
PCT Pub. Date: Mar. 7, 2013

(65) Prior Publication Data
US 2014/0232736 A1 Aug. 21, 2014

(51) Int. Cl.
| G06T 5/00 | (2006.01) |
| B60K 35/00 | (2006.01) |
| G02B 26/08 | (2006.01) |
| G02B 26/10 | (2006.01) |
| H04N 9/31 | (2006.01) |
| G02B 27/01 | (2006.01) |
| B60K 37/02 | (2006.01) |
| G03B 21/14 | (2006.01) |
| G09G 5/30 | (2006.01) |

(52) U.S. Cl.
CPC .............. *G06T 5/009* (2013.01); *B60K 35/00* (2013.01); *B60K 37/02* (2013.01); *G02B 26/0841* (2013.01); *G02B 26/101* (2013.01); *G02B 27/0101* (2013.01); *G03B 21/14* (2013.01); *G09G 5/30* (2013.01); *H04N 9/3129* (2013.01); *B60K 2350/2052* (2013.01); *G02B 2027/0118* (2013.01)

(58) Field of Classification Search
None
See application file for complete search history.

(56) References Cited

U.S. PATENT DOCUMENTS

| 6,169,526 B1 | 1/2001 | Simpson et al. | |
| 2008/0212034 A1* | 9/2008 | Aksyuk et al. | 353/20 |
| 2009/0046140 A1* | 2/2009 | Lashmet et al. | 348/51 |
| 2010/0182668 A1* | 7/2010 | Abe et al. | 359/202.1 |
| 2010/0254019 A1* | 10/2010 | Cui et al. | 359/633 |
| 2011/0205497 A1 | 8/2011 | Wakabayashi et al. | |
| 2012/0069415 A1* | 3/2012 | Freeman | G02B 26/085 359/202.1 |

(Continued)

FOREIGN PATENT DOCUMENTS

| DE | 102007061962 A1 | 7/2008 |
| WO | 2010061272 A1 | 6/2010 |

*Primary Examiner* — Vu Nguyen
(74) *Attorney, Agent, or Firm* — Cozen O'Connor

(57) ABSTRACT

The present invention relates to a method of projecting a portion of an image, which is to be projected on to a display area, with improved brightness, comprising the steps of, configuring a projector such that it projects over a portion of the display area, modifying a signal which defines the pixels of the image, to provide a signal which defines pixels of a portion of the image. The present invention further relates to a corresponding device.

15 Claims, 7 Drawing Sheets

(56) References Cited

U.S. PATENT DOCUMENTS

2012/0275001 A1* 11/2012 Ishibashi .................... 359/199.1
2013/0033650 A1* 2/2013 Roberts .................. G09F 19/18
  348/744

* cited by examiner

DEVICE AND METHOD FOR CONSECUTIVELY PROJECTING DIFFERENT PORTIONS OF AN IMAGE

FIELD OF THE INVENTION

The present invention concerns a device and method for projecting an image, or part of an image, and in particular, but not exclusively, a device and method for projecting an image, or part of an image, with improved brightness.

DESCRIPTION OF RELATED ART

A MEMS micro-mirror device is a device that contains an Micro-Electrical-Mechanical-System that comprises a reflective member. The MEMS may comprise a cylindrical, rectangular, elliptical or square micro-mirror that is adapted to move and to deflect light over time. The micro-mirror is usually connected by torsion arms to a fixed part and can tilt and oscillate along one or two axis. Different actuation principles can be used, including electrostatic, thermal, electro-magnetic or piezo-electric. MEMS micro-mirror devices are known in which the area of these micro-mirrors are around a few $mm^2$. In this case, the dimensions of the MEMS device, comprising the packaging, is around ten $mm^2$. This device is usually made of silicon, and can be encapsulated in a package that can include the driving actuation electronics. Various optical components, such as for example lenses, beam combiner, quarter-wave plates, beam splitter and laser chips, can also be assembled with the packaged MEMS to build a complete system such as, for example, a projection system.

A typical application of the MEMS micro-mirror devices is for projection systems. In a projection system, a 2-D image or a video can be displayed on a display surface; each pixel of the 2-D image or a video is generated by combining modulated red, green and blue and/or other wavelength laser light sources, such as UV or IR, by means of, for example, a beam combiner. The combined light from the modulated red, green and blue laser is emitted from the beam combiner as a beam of light. The beam of light emitted from the beam combiner comprises pulses, and each pulse will correspond to a pixel of the 2-D image or a video. A MEMS micro-mirror device directs the beam of light to a MEMS micro-mirror which is oscillated to scan the beam of light in a zig-zag, unidirectional or bidirectional raster (interlaced or not interlaced) or lissajou pattern across the display surface so that the 2-D image, or a video, is displayed on the display surface, pixel-by-pixel. The MEMS micro-mirror within the MEMS micro-mirror device will continuously oscillate to scan light, for example, from left to right and from top to bottom so that each pixel of the 2-D image or a video which is projected onto the display surface, is continuously refreshed. The speed of oscillation of the MEMS micro-mirror is such that a complete 2-D image or a video is visible on the display surface.

A MEMS micro-mirror may be configured to be able to oscillate along one axis. Therefore, in order to display a 2-D image on a display surface, a projection system will require a first MEMS micro-mirror to scan light along the horizontal and a second MEMS micro-mirror to scan light along the vertical. The first and the second MEMS micro-mirrors are preferably precisely positioned such that the oscillatory axes are orthogonal.

During operation, the micro-mirror of the first MEMS micro-mirror receives light from the beam combiner and deflects the light to the second MEMS micro-mirror. The second MEMS micro-mirror will in turn deflect the light to the display surface where it will appear as pixels of an image. The first MEMS micro-mirror will oscillate about its oscillatory axis to scan the light along the horizontal, thereby displaying the first row of pixels on the display surface, pixel by pixel. When the first row of pixels have been projected onto the display surface, the second MEMS micro-mirror will oscillate about its oscillatory axis so that light received from the first MEMS micro-mirror is directed towards the next row where pixels are to be displayed. The first MEMS micro-mirror will then oscillate to scan the light along the horizontal to display the next row of pixels. The process is continuous so that a complete image is visible on the display surface. It is also possible that both the first and second MEMS micro-mirrors oscillate simultaneously, to scan light in a zig-zag, or so-called raster, direction across the display surface.

Typically projection systems comprise a MEMS micro-mirror device which comprises a single 2-D MEMS micro-mirror which can oscillate along two orthogonal oscillation axes. During operation, the single 2-D MEMS micro-mirror receives modulated light from the beam combiner and deflects the light to a display surface where it will appear as a pixel. The single 2-D MEMS micro-mirror will oscillate along a first oscillation axis to scan the light along the horizontal, thereby displaying the first row of pixels on the display surface. When the first row of pixels are have been projected onto the display surface, the single 2-D MEMS micro-mirror oscillates about a second oscillation axis (which is orthogonal to the first oscillation axis) so that light received from the beam combiner is directed towards the next row where pixels are to be displayed. The single 2-D MEMS micro-mirror will then oscillate along the first oscillation axis to scan the light from the beam combiner along the horizontal thereby displaying the next row of pixels on the display surface. Preferably, both the first and second MEMS micro-mirrors oscillate simultaneously, to scan light in a zig-zag, or so-called raster, direction across the display surface. The process is continuous so that a complete image is visible on the display surface. It is also possible that the 2-D MEMS micro-mirror oscillates about both the first and second oscillation axis simultaneously. The advantage of using a single 2-D MEMS micro-mirror which can oscillate along two orthogonal oscillation axes, is that only a single micro-mirror is required to display a 2-D image on a display surface.

Existing projection systems typically project images over the whole area of a display surface such as a projection screen. The light projected from the projection system is thus spread over the whole display surface. For large display surfaces the brightness of the projected image is deceased as the light is spread over the whole display surface.

Of course light projected from the projection system can be concentrated to provide a brighter image; but focusing the light results in a smaller version of the projected image.

Often, an object in an image (i.e. a pictogram) to be projected will only form part of the whole image; the remaining parts of the image being blank, for example an image of a person with a black background. In this example the pictogram of the person only forms part of the whole image, with the black background forming the remaining parts of the image. A projection system will project the whole image, some of the projected light being used to project the black background part of the image. Thus, existing projection systems have inefficient use of light.

For a given projection system, which provides uniform image brightness, the brightness of the projected whole image (B) is given by the following equation:

$B=T*(P/S)$ wherein B brightness of the projected whole image; T is the total brightness of the light projected by the projection system; and P is the area size occupied by the pictogram in the whole image, and S is the area size of the whole image.

As only part of the total brightness of the light projected by the projection system is used to project the pictogram of an image, the brightness of the projected pictogram will not be optimum.

It is an aim of the present invention to mitigate, or obviate, at least some of the above-mentioned disadvantages.

BRIEF SUMMARY OF THE INVENTION

According to the invention, these aims are achieved by means of a method of projecting a portion of an image, which is to be projected on to a display area, with improved brightness, comprising the steps of, configuring a projector such that it projects over a portion of the display area, modifying a signal which defines the pixels of the image, to provide a signal which defines pixels of a portion of the image.

The display area may be defined by any suitable means. The display area may be configured to absorb the UV light and re-emmit visible light; for example the display area may comprise a film, configured to absorb the UV light and re-emmit visible light. The display area may be defined by a portion of or all of a windshield, or windscreen. For example, the display area may be a windscreen of an automobile. The display area may be defined by a portion of or all of a window. For example the display area may be defined by a display window in a shop. The display area may be defined by an advertising board such as a billboard. The display area may be any suitable projection screen. The method may further comprise the step of provided a display area which is configured to absorb UV light and re-emmit visible light; for example the display area may comprise a film, configured to absorb the UV light and re-emmit visible light. The method may further comprise the step of provided a display area which is configured to absorb Infra-red light and re-emmit visible light; for example the display area may comprise a film, configured to absorb the Infra-Red light and re-emmit visible light.

The portions of the image may be consecutive parts of an image i.e. parts which directly cooperate. Alternatively the portions of image may not be in direct cooperation e.g. the portions may be separate portions which do not touch each other. Preferably a portion of the image is defined as the smallest rectangle around a pictogram in the image. Preferably the portions are rectangles.

The method may comprise the steps of, configuring a projector such that it projects consecutively over one or more other portions of the display area; modifying a signal which defines the pixels of the image to provide a one or more signals each of which defines pixels of one or more other portions of the image.

The step of configuring a projector such that it projects over a portion of the display area, may comprise the step of modifying the amplitude of oscillations of a first mirror which oscillates to scan light.

The step of configuring a projector such that it projects over a portion of the display area, may further comprise the step of modifying the amplitude of oscillations of a second mirror which oscillates to scan light.

The method may further comprise the step of providing an off-set to one or more mirrors which can oscillate to scan light over some or all of a surface. The surface may define the display area. The method may further comprise the step of providing an off-set to one or more mirrors which can oscillate to scan light over some or all of the display area.

The method may further comprise the step of providing an off-set to one or more actuation signals which is/are configured to actuate oscillation of one or more mirrors which can oscillate to scan light over some or all of a surface. The surface may define the display area The method may comprise the step of providing a physical offset to one or more mirrors which can oscillate to scan light over some or all of a surface. The surface may define the display area. The step of providing a physical offset may comprise the step of providing a holder on which a mirror can be mounted and tilting the holder such that a mirror mounted on the holder is provided with a physical offset. The step of providing a physical offset may comprise the step of providing a frame around one or more mirrors and adjusting this position of the frame using at least one of a magnetic, electrostatic, thermal, or piezo actuator, holder to provide the physical offset. The frame may be a silicon frame.

The one or more mirrors may comprise a first mirror and second mirror, wherein the first mirror oscillates at a faster rate than the second mirror. The first mirror may oscillate to scan light along the horizontal. The second mirror may oscillate to scan light along the vertical.

The method may comprise the step of providing an off-set to an actuation signals which actuates oscillation of the second mirror and providing a physical offset to the first mirror.

The method may further comprise the step of consecutively providing a plurality of off-sets to an actuation signal which is configured to actuate oscillation of a mirror which can oscillate to scan light over some or all of a surface.

The method may further comprise the adjusting the two or more signals such that the two or more different portions of the image have equal brightness. The method may comprise the step of adjusting the power in one of the two or more signals such that the two or more different portions of the image have equal brightness. The method may comprise the step of adjusting the power of one or more lasers such that the two or more different portions of the image have equal brightness. The method may comprise the step of adjusting a laser power signal. The method may comprise the step of reducing the power in one of the two or more signals, or dimming one of the two or more signals, such that the two or more different portions of the image have equal brightness. The method may comprise the step of reducing the power of one or more lasers such that the two or more different portions of the image have equal brightness. The method may comprise the step of reducing a laser power signal.

The method may further comprise the step of configuring the projector such that the two or more different portions of the image are of equal size when projected.

The method may further comprise the steps of, configuring the projector such that it projects consecutively over one or more other portions of a display area; modifying the signal which defines the pixels of the image to provide a two or more signals each of which defines pixels of two or more different portions of the image.

According to the present invention there is provided a method of projecting an image with improved brightness, the method comprising the steps of, configuring a projector such that it projects consecutively over one or more other portions of a display area; modifying a signal which defines the pixels of the image to provide a two or more signals each of which defines pixels of two or more different portions of the image.

According to a further aspect of the present invention there is provided a device which is operable to project an image over a display area, the device comprising, a means for configuring the device such that it projects over a portion of the display area, a means for modifying a signal which defines the pixels of an image, to provide a signal which defines pixels of a portion of the image, such that the portion of the image can be projected, with an improved brightness, on the portion of the display area.

The device may further comprise, a means for configuring the device such that it projects consecutively over one or more other portions of the display area; a means for modifying a signal which defines the pixels of an image to provide a one or more other signals each of which defines pixels of one or more other portions of the image.

The means for configuring the device such that it projects consecutively over one or more other portions of the display area, may comprise a means for modifying the amplitude of oscillations of a first mirror which oscillates to scan light.

The means for configuring the device such that it projects consecutively over one or more other portions of the display area, may further comprise a means for modifying the amplitude of oscillations of a second mirror which oscillates to scan light.

The first mirror may be configured to oscillate to scan light in a horizontal direction and the second mirror may be configured to oscillate to scan light in a vertical direction. The second mirror may be configured to oscillate to scan light in a horizontal direction and the first mirror may be configured to oscillate to scan light in a vertical direction.

The device may further comprise a means for providing an off-set to one or more mirrors which can oscillate to scan light over some or all of the display area.

The device may further comprise a means for providing an off-set to an actuation signal which actuates oscillation of a mirror which oscillates to scan light over the display area, such that an image is projected at a selected portion of the display area.

The device may comprise a means for adjusting the off-set.

The means for providing an off-set may further comprise a means for consecutively providing a plurality of off-sets to an actuation signal which actuates oscillation of a mirror which oscillates to scan light, so that images can be consecutively projected to different portions of the display area.

The means for providing an off-set may further comprise a means for providing a physical offset to one or more mirrors which can oscillate to scan light over some or all of the display area. The means for providing a physical offset may comprise a holder on which a mirror can be mounted wherein in the holder is configured such that it can be tilted such that a mirror mounted on the holder is provided with a physical offset. The means for providing a physical offset may comprise a frame around one or more mirrors wherein the frame is configured such that its position can be adjusted using at least one of a magnetic, electrostatic, thermal, or piezo actuator means, to provide a mirror in the frame with a physical offset. The frame may be a silicon frame.

The device may comprise a first mirror and second mirror, wherein the first mirror oscillates at a faster rate than the second mirror. The first mirror may oscillate to scan light along the horizontal. The second mirror may oscillate to scan light along the vertical.

The device may comprise a means for providing an off-set to an actuation signal which actuates oscillation of the second mirror and a means for providing a physical offset to the first mirror.

The device may further comprise a means for consecutively providing a plurality of off-sets to an actuation signal which is configured to actuate oscillation of a mirror which can oscillate to scan light over some or all of a surface.

The device may comprise a single UV laser which is configured to provide a signal which defines pixels of the portion of the image.

The display area may be defined by any suitable means. The display area may be configured to absorb UV light and re-emmit visible light; for example the display area may comprise a film, configured to absorb the UV light and re-emmit visible light. The display area may be configured to absorb Infra-red light and re-emmit visible light; for example the display area may comprise a film, configured to absorb the Infra-Red light and re-emmit visible light. The display area may be defined by a portion of or all of a windshield, or windscreen. For example, the display area may be a windscreen of an automobile. The display area may be defined by a portion of or all of a window. For example the display area may be defined by a display window in a shop. The display area may be defined by an advertising board such as a billboard. The display area may be any suitable projection screen.

The device may comprise a UV light source. The device may comprise a single or multiple combined UV (Ultra-Violet) light sources. The device is arranged to cooperate with a surface which defines a display area, wherein the surface which defines the display area comprises a means to absorb the light from the UV light source to display an image, and to re-emitted visible light. The means to absorb the light from the UV light source to display an image, may comprise a film.

Additionally, or alternatively, the device may comprise an IR (Infra-Red) light source. The device may comprise a single or multiple Infra-Red light sources. The device may be arranged to cooperate with a surface which defines a display area, wherein the surface which defines the display area comprises a means to absorb the light from the Infra-Red light source to display an image, and to re-emitted visible light. The means to absorb the light from the Infra-Red light source to display an image may comprise a film.

According to a further aspect of the present invention there is provided a surface which defines a display area on which an image can be projected using any one of the above-mentioned devices, wherein the surface further comprises a means to absorb the light from the UV light source provided in the device, to display an image, and to re-emitted visible light. The means to absorb the light from the UV light source to display an image, may comprise a film. Alternatively, or additionally, the surface may comprise a means to absorb light from the Infra-Red light source provided in the device, to display an image, and to re-emitted visible light. The means to absorb the light from a Infra-Red light source provided in the device to display an image may comprise a film. The surface which defines the display area may comprise at least one of a window or advertising platform. The window may be a shop window. The advertising platform may be a billboard.

The device may further comprise a means for configuring the device such that it projects consecutively over two or more portions of a display area; and a means for modifying a signal which defines the pixels of the image to provide two or more signals each of which defines pixels of two or more different portions of the image, such that two or more different portions of the image can be consecutively projected to the two or more portions of a display area.

The device may further comprise, a means for configuring the device such that it projects consecutively over one or more other portions of the display area; a means for modifying a signal which defines the pixels of an image to provide a one or more other signals each of which defines pixels of one or more other portions of the image.

The means for configuring the device such that it projects consecutively over one or more other portions of the display area, may comprise a means for modifying the amplitude of oscillations of a first mirror which oscillates to scan light.

The means for configuring the device such that it projects consecutively over one or more other portions of the display area, may further comprise a means for modifying the amplitude of oscillations of a second mirror which oscillates to scan light.

The first mirror may be configured such that it can oscillate to scan light in a horizontal direction and the second mirror is configured such that it can oscillate to scan light in a vertical direction.

The device may comprise a means for providing an off-set a mirror which oscillates to scan light over the display area, such that an image is projected at a selected portion of the display area. The device may comprise a means for providing an off-set to an actuation signal which actuates oscillation of a mirror which oscillates to scan light over the display area, such that an image is projected at a selected portion of the display area The means for providing an off-set may further comprise a means for consecutively providing a plurality off-sets a mirror which oscillates to scan light, so that images can be consecutively projected to different portions of the display area. The means for providing an off-set may further comprise a means for consecutively providing a plurality off-sets to an actuation signal which actuate oscillation of a mirror which oscillates to scan light, so that images can be consecutively projected to different portions of the display area.

The device may further comprise a means for adjusting the two or more signals such that the two or more different portions of the image have equal brightness. The device may further comprise a means for adjusting the power in one of the two or more signals such that the two or more different portions of the image have equal brightness. The device may further comprise a means for reducing the power in one of the two or more signals, or dimming one of the two or more signals, such that the two or more different portions of the image have equal brightness.

The device may further comprise a means for configuring the projector such that the two or more different portions of the image are of equal size when projected.

According to the present invention there is provided a device for projecting an image with improved brightness, the device comprising a means for configuring the device such that it projects consecutively over one or more other portions of a display area; a means for modifying a signal which defines the pixels of the image to provide two or more signals each of which defines pixels of two or more different portions of the image.

According to a further aspect of the present invention there is provided an automobile comprising one or more of any the aforementioned devices. The device may be configured in the automobile such that a windshield, windscreen, or any window of the automobile defines the display area. For example the rear window of an automobile may define the display area. For example, the front window of an automobile may define the display area.

The windshield or windscreen may be configured to absorb UV light and re-emmit visible light; for example the windshield or windscreen may comprise a film, configured to absorb the UV light and re-emmit visible light. The windshield or windscreen may be configured to absorb Infra-red light and re-emmit visible light; for example the windshield or windscreen may comprise a film, configured to absorb the Infra-Red light and re-emmit visible light.

According to a further aspect of the present invention there is provided a projection system comprising any one of the aforementioned devices, coupled with one or more sensor which is configured to sense a field of view of a user, and a processing unit in operable communication with the device to configure the device to project a portion of an image of the field of view sensed by the one or more sensor.

Wherein the projection system further comprises an eye tracking mean which tracks the direction in which a user is viewing.

The one or more sensor and processing unit may be configured to provide augmented reality. For example, the sensor can sense and object in the field of view, and then add to the projected image information or data processed by the processing unit and in relation with the sensed object. This can be combined with an eye tracking system that modifies the position of the added data/information in the projected image, according to the position of the eye of the user.

The one or more sensor may comprise at least one of a camera and/or distance sensor for sensing the shape and/or the movement of an object in a field of view. The distance sensor may also be configured to sense the distance of an object in a field of view, from a user.

BRIEF DESCRIPTION OF THE DRAWINGS

The invention will be better understood with the aid of the description of an embodiment given by way of example only and illustrated by the figures, in which.

DETAILED DESCRIPTION OF POSSIBLE EMBODIMENTS OF THE INVENTION

Figure 1:
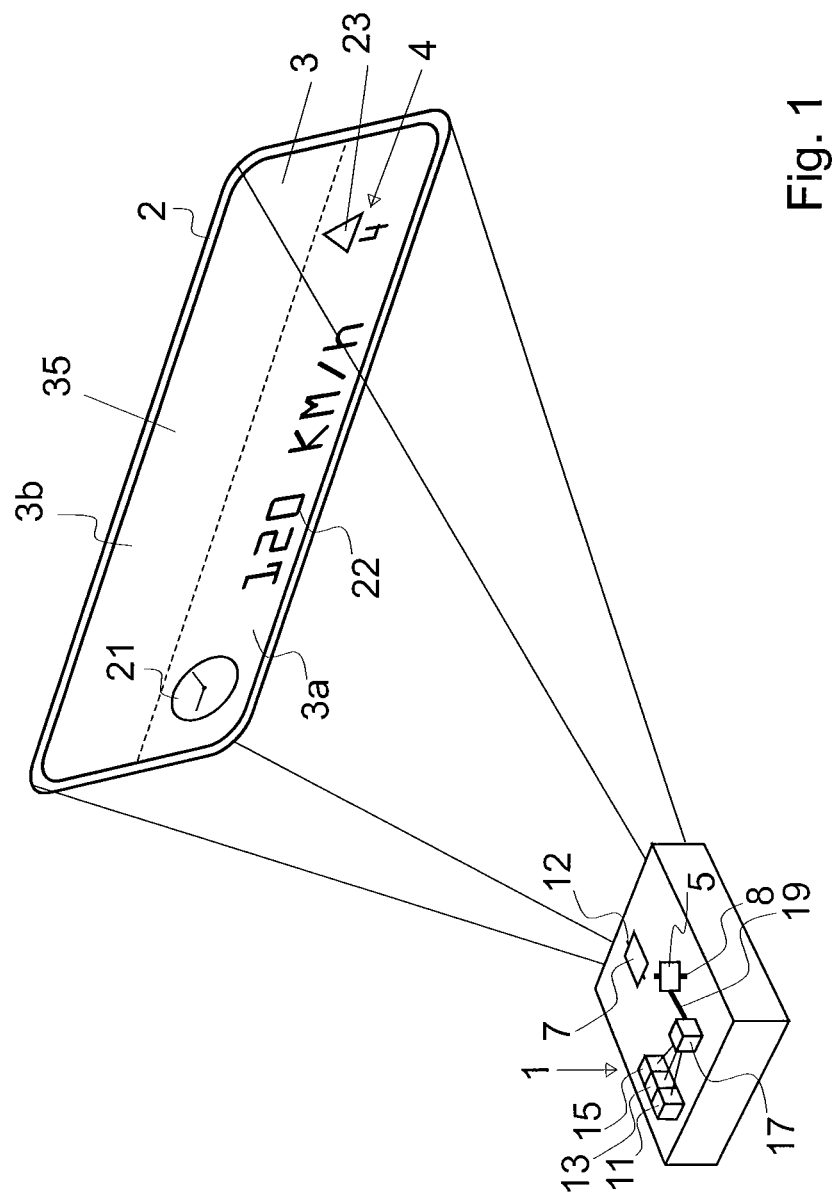
FIG. 1 provides a perspective view of a device according to one embodiment of the present invention.

FIG. 1 shows a device 1 which projects an image 3 which is defined by a plurality of pixels (not shown) over a display area 2. In this example the display area 2 is defined by an automobile windscreen 2. The image is projected over the whole area of the display area 2. It will be understood that the display area 2 could be defined by any other suitable means, e.g. a shop window.

The image 3 comprises a plurality of pictograms 4, which in this example comprise a clock pictogram 21, a speed dial pictogram 22 and a traffic sign pictogram 23. It will be understood that the pictograms 4 could take any form. The remaining parts of the image 3 are blank parts 35, which comprise no pictographic data. The image 3 is selectively divided into a first part 3a which comprises a plurality of pictograms 4 and a second part 3b which comprise no pictographic data. It will be understood that the image could be selectively divided into any number of parts.

The device 1 comprises a first and second MEMS micro mirror 5, 7 which oscillate to scan light from across the display area 2. The first MEMS micro mirror 5 can oscillate about a first oscillation axis 8 and the second MEMS micro mirror 7 can oscillate about a second oscillation axis 12. The first and second oscillation axes 8,12 are preferably arranged orthogonal to each other. It will be understood that a single 2-D MEMS micro mirror which oscillates about two orthogonal oscillation axes may alternatively be provided.

The device 1 comprises a red 11, green 13 and blue 15 laser light source and/or any other laser wavelength such as IR and/or UV (not shown), and a beam combiner 17 which is in optical communication with each of the light sources 11, 13, 15. Each pixel of the image 3 is generated by combining modulated red 11, green 13 and blue 15 laser light sources and/or IR and/or UV laser(s) (not shown), by means of, for example, a beam combiner 17. The combined light from the modulated red, green and blue laser and/or IR and/or UV laser(s) (not shown) is emitted from the beam combiner as a beam of light 19. The beam of light 19 emitted from the beam combiner 17 comprises pulses, and each pulse will correspond to a pixel of the image 3. Alternatively, instead of a red 11, green 13 and blue 15 laser light source and a beam combiner 17, the device 1 may comprise a single or multiple UV light source or single or multiple Infra-Red light source (not shown). The automobile windscreen 2 which defines the display area 2 may be provided with a film which is configured to absorb the UV light or Infra-Red light which is provided by the UV light source or Infra-Red light source and re-emmit visible light (this is known as the stoke-shift effect). The UV light or Infra-red light is absorbed by the film to display an image on the windscreen 2. It is also possible that the device has a plurality of UV light sources and/or Infra-Red light sources (not shown). The plurality of UV light sources and/or Infra-Red light sources may be operably coupled to with a beam combiner, in order to increase the overall output power of the device and thus the overall brightness of the images projected.

During operation, the first MEMS micro-mirror 5 receives light 19 from the beam combiner 17 and deflects the light to the second MEMS micro-mirror 7. The second MEMS micro-mirror 7 will in turn deflect the light to the display area 2 where it will appear as pixels of the image 3. The first MEMS micro-mirror 5 will oscillate about its oscillatory axis 8 to scan the light 9 which is received from the beam combiner 17, along the horizontal, thereby displaying a first row of pixels on the display area 2, pixel by pixel. When the first row of pixels has been projected onto the display area 2, the second MEMS micro-mirror 7 will oscillate about its oscillatory axis 12 so that light it received from the first MEMS micro-mirror is directed towards the next row where pixels are to be displayed. The first MEMS micro-mirror 5 will then oscillate to scan the light along the horizontal to display the next row of pixels. The process is continuous so that a complete image 3 is visible on the display area 2. The amplitudes of oscillation of the first and second MEMS micro mirrors 5, 7 are such that light 19 from the beam combiner 17 is scanned across the whole area of the display area 2; thus the image 3 is projected onto the whole area of the display area 2.

It is also possible that both the first and second MEMS micro-mirrors 5, 7 oscillate simultaneously, to scan light in a zig-zag or raster direction across the display area 2. It will also be understood that the device 1 may comprise a single 2D MEMS micro-mirror, which can oscillate about two orthogonal oscillation axes, instead of the first and second MEMS micro-mirrors 5, 7 which each oscillate about two orthogonal oscillation axes.

As discussed the image 3 comprises a plurality of pictograms 4, which in this case comprise a clock pictogram 21, a speed dial pictogram 22 and a traffic sign time pictogram 23. The remaining parts of the image 3 are comprising blank parts 35 which have no pictographic data. The image 3 can thus be selectively divided into a first part 3a which comprises a plurality of pictograms 4 and a second part 3b which comprise no pictographic data. The light 19 provided by the beam combiner 17 is used to display the whole image 3 i.e. both the first part 3a and the second part 3b; thus the light 19 provided by the beam combiner 17 is used to display the pictograms 4. The whole image 3 in FIG. 1 is sized such that, light 19 provided by the beam combiner 17 is only provided to the first and second oscillating MEMS micro-mirrors 5, 7 only over part of the oscillation of the first and second MEMS micro-mirrors 5, 7. Thus, the first and second MEMS micro-mirrors 5, 7 do not project light over their entire oscillation amplitude. Accordingly, the projection system's operation is inefficient.

The present invention aims to provide a brighter image, or brighter pictograms 4, by using all, or at least most of, the light 19 provided by the beam combiner 17, to display the first part 3a of the image 3. The present invention achieves this by reducing the area over which the device 1 projects and modifying the light 19 provided by the beam combiner 17 such that it defines pixels of the first part 3a of the image 3 only. The result is that the pictograms 4 appear brighter, as the light which would have been used to display the second part 3b of the image, is now used to display the first part 3a of the image. Furthermore, by adjusting the speed of oscillation of first and second MEMS micro-mirrors 5, 7; modifying the light 19 provided by the beam combiner 17; combined with reducing the area over which the device 1 projects will ensure that the first part 3a of the image can be refreshed more often. Alternatively, only the speed of one of the first or second MEMS micro-mirrors 5, 7 is adjusted. Preferably, the speed of the slower oscillating mirror is adjusted.

According to the present invention, the device 1 is configured to project over a portion of the display area 2. In this particular example, this is achieved by adjusting the amplitude of oscillations of both the first and second MEMS micro-mirrors 5, 7. More specifically, the amplitude of oscillations of both the first and second MEMS micro-mirrors 5, 7, are decreased. This can be achieved by decreasing the amplitude of the actuation signal which actuates oscillation of the first and second MEMS micro-mirrors 5, 7. As the amplitude of oscillations of both the first and second MEMS micro-mirrors 5, 7, is decreased the light 19 from the beam combiner will be scanned over a portion of the display area 2, and not over the whole of the display area 2; thus the device 1 will project over a portion of the display area 2.

Figure 2:
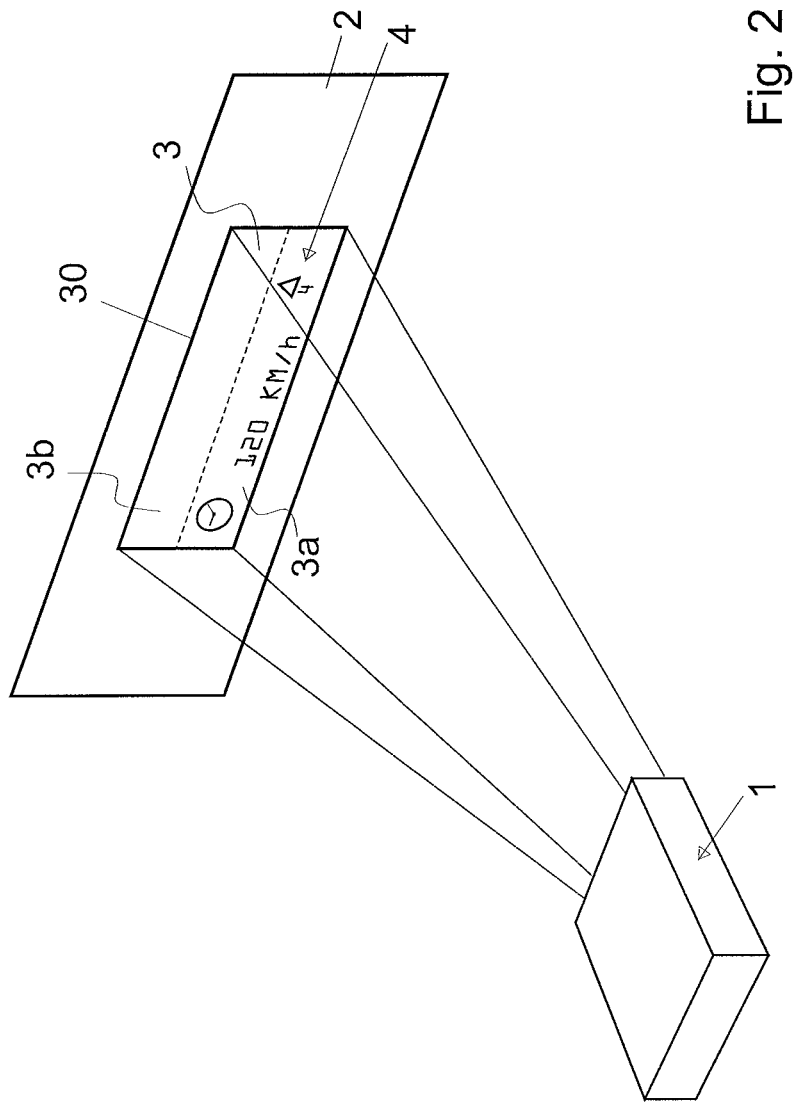
FIG. 2 illustrates the effect of decreasing the amplitude of oscillations MEMS micro-mirrors which are in the device of FIG. 1.

The result of decreasing the amplitude of oscillations of both the first and second MEMS micro-mirrors 5, 7, is depicted in FIG. 2. Reducing the amplitude of oscillation of the first MEMS micro-mirror 5 will reduce the horizontal distance on the display area 2 over which the light 19 is scanned. Reducing the amplitude of oscillation of the second MEMS micro-mirror 7 will reduce the vertical distance on the display area 2 over which the light 19 is scanned. Thus, whole of the image 3 (first part 3a and second part 3b) is now projected over a portion 30 of the display area 2. Thus, the whole image 3 will appear smaller than its original size (i.e. the size of the image 3 when it was projected over the whole of the display area 2, as shown in FIG. 1).

The light 19 provided by the beam combiner 17 is then modulated such that the light 19 provided by the beam combiner 17 defines only pixels for the first part 3a of the image 3. This modulation may be achieved using digital processing circuits or optical signal processing circuits. Thus, all the light 19 provided by the beam combiner 17 now defines only pixels for the first part 3a of the image 3 which comprises the pictograms 4; the portion of the light 19 which would have been used to project the second part 3b of the image, is now used to project the first part 3a so that more of the light 19 provided by the beam combiner 17 is used to define pixels of the pictograms 4. As a result the pictograms 4 appear brighter.

Figure 3:
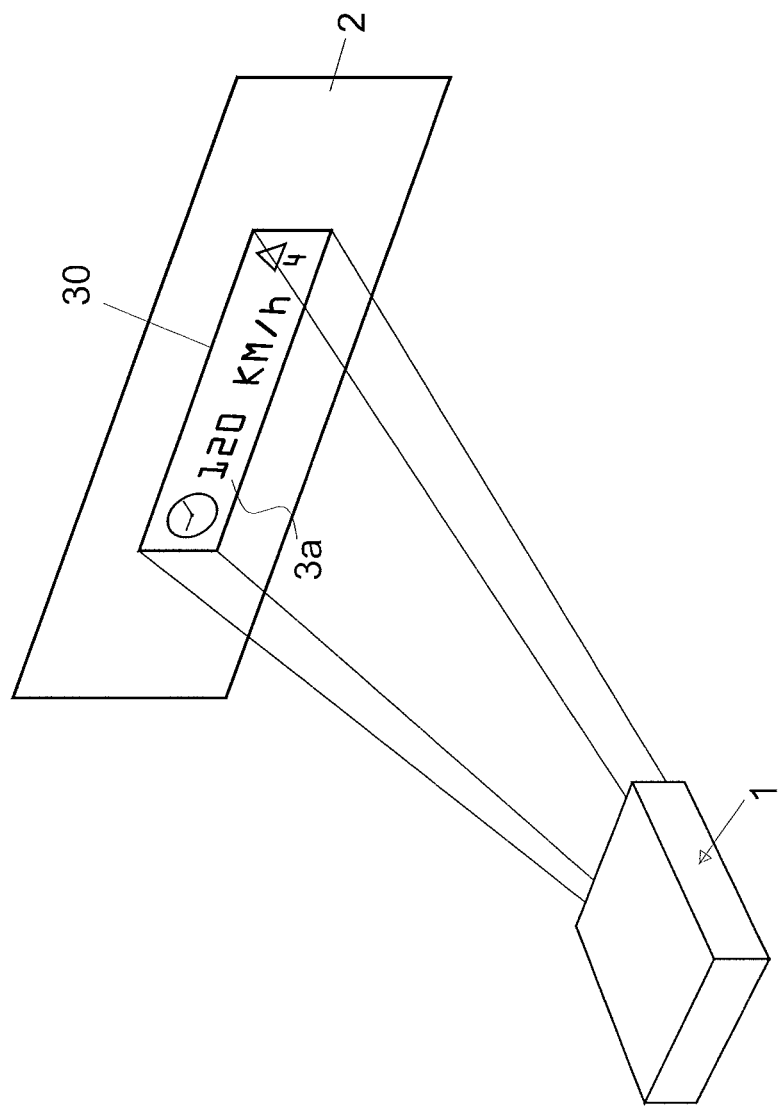
FIG. 3 illustrates the effect of modulating light which is provided by a beam combiner in the device of FIG. 1.

The result of modulating the light 19 provided by the beam combiner 17 is shown in FIG. 3. As shown in FIG. 3 the original size of the first part 3a of the image is restored by modulating the light 19 provided by the beam combiner 17. Thus, the first part 3a of the image is projected with its original size, but with improved brightness.

FIGS. 2 and 3 illustrate the effects when the amplitude of oscillations of both the first and second MEMS micro-mirrors 5, 7, are decreased. It will be understood that it is also possible that the amplitude of oscillations of only one of the first or second MEMS micro-mirrors 5, 7 is decreased.

Figure 4:
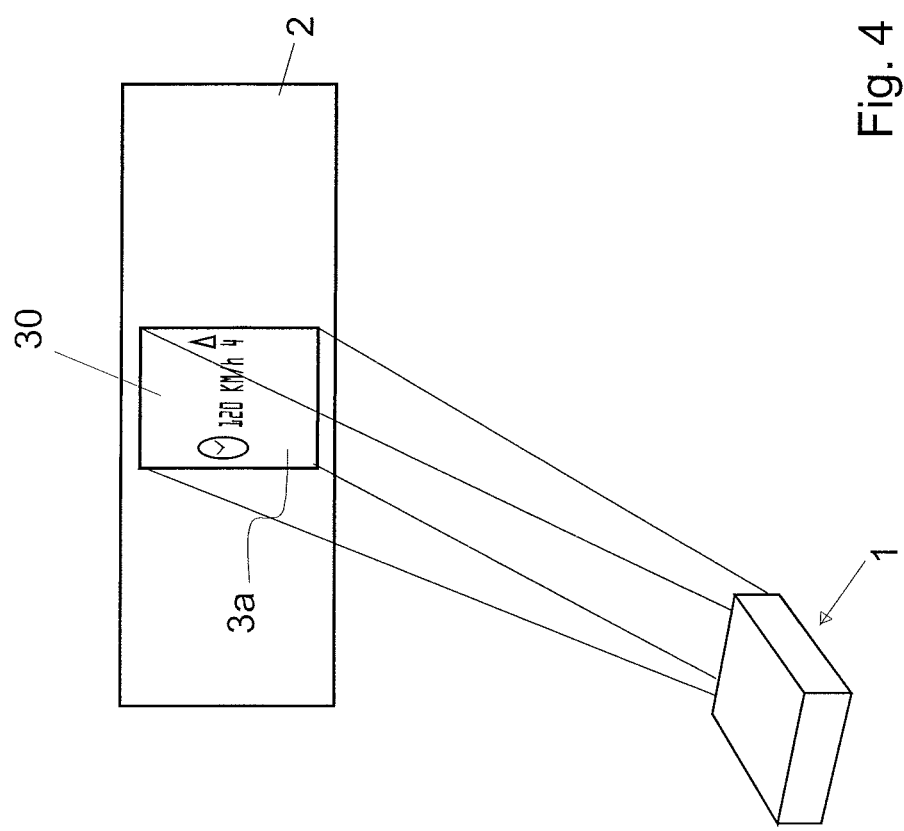
FIG. 4 illustrates the effect of decreasing the amplitude of oscillations of a first MEMS micro-mirror in the device of FIG. 1.

FIG. 4, shows the effect when the amplitude of oscillations of the first MEMS micro-mirror 5 only is decreased, and the light 19 provided by the beam combiner 17 is modulated such that the light 19 provided by the beam combiner 17 defines only pixels for the first part 3a of the image 3. Reducing the amplitude of oscillation of the first MEMS micro-mirror 5 will reduce the horizontal distance on the display area 2 over which the light 19 is scanned; as the amplitude of oscillation of the second MEMS micro-mirror 7 is not reduced the vertical distance on the display area 2 over which the light 19 is scanned remains unchanged (i.e. the whole vertical length of the display area 2). Thus, the first part 3a of the image is projected on a side portion 40 of the display area 2

Figure 5:
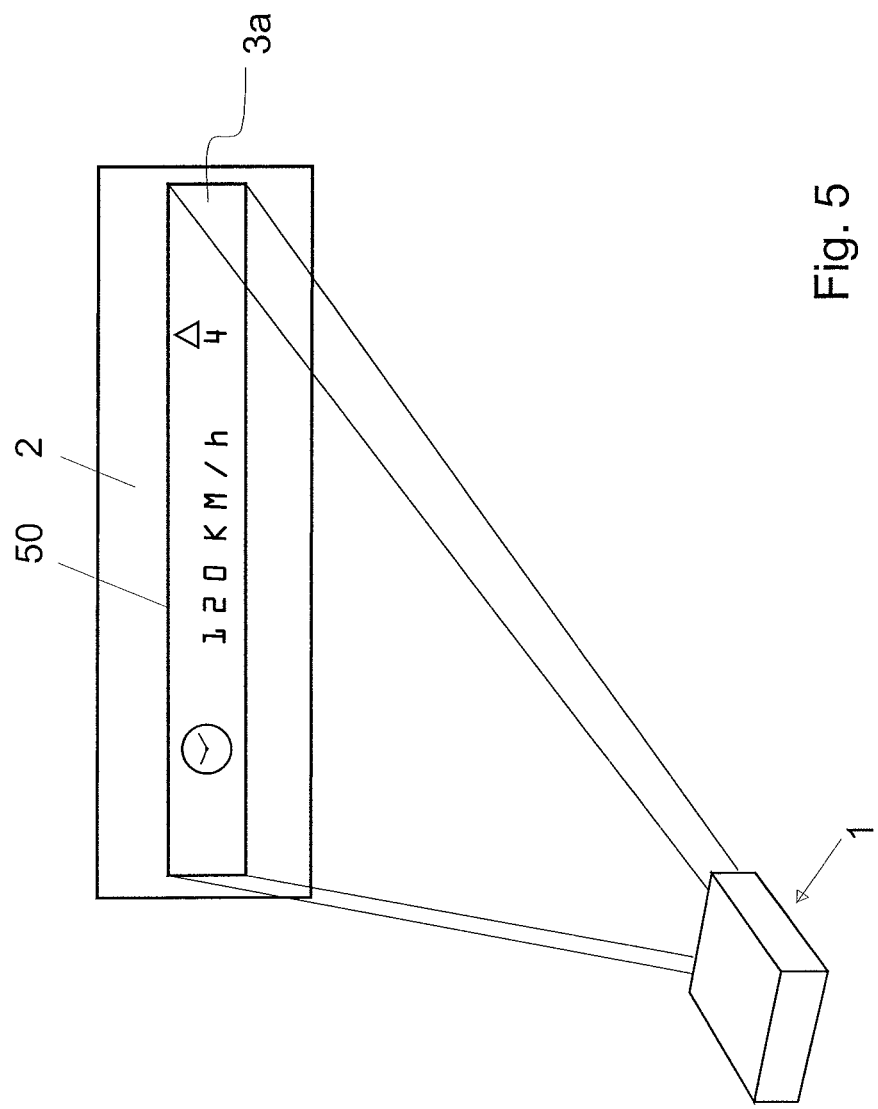
FIG. 5 illustrates the effect of decreasing the amplitude of oscillations of a second MEMS micro-mirror in the device of FIG. 1.

Likewise, FIG. 5, shows the effect when the amplitude of oscillations of the second MEMS micro-mirror 7 only is decreased, and the light 19 provided by the beam combiner 17 is then modulated such that the light 19 provided by the beam combiner 17 defines only pixels for the first part 3a of the image 3. Reducing the amplitude of oscillation of the second MEMS micro-mirror 7 will reduce the vertical distance on the display area 2 over which the light 19 is scanned; as the amplitude of oscillation of the first MEMS micro-mirror 5 is not reduced the horizontal distance on the display area 2 over which the light 19 is scanned remains unchanged (i.e. the whole horizontal height of the display area 2). Thus, the first part 3a of the image is projected on an end portion 50 of the display area 2.

Figure 6:
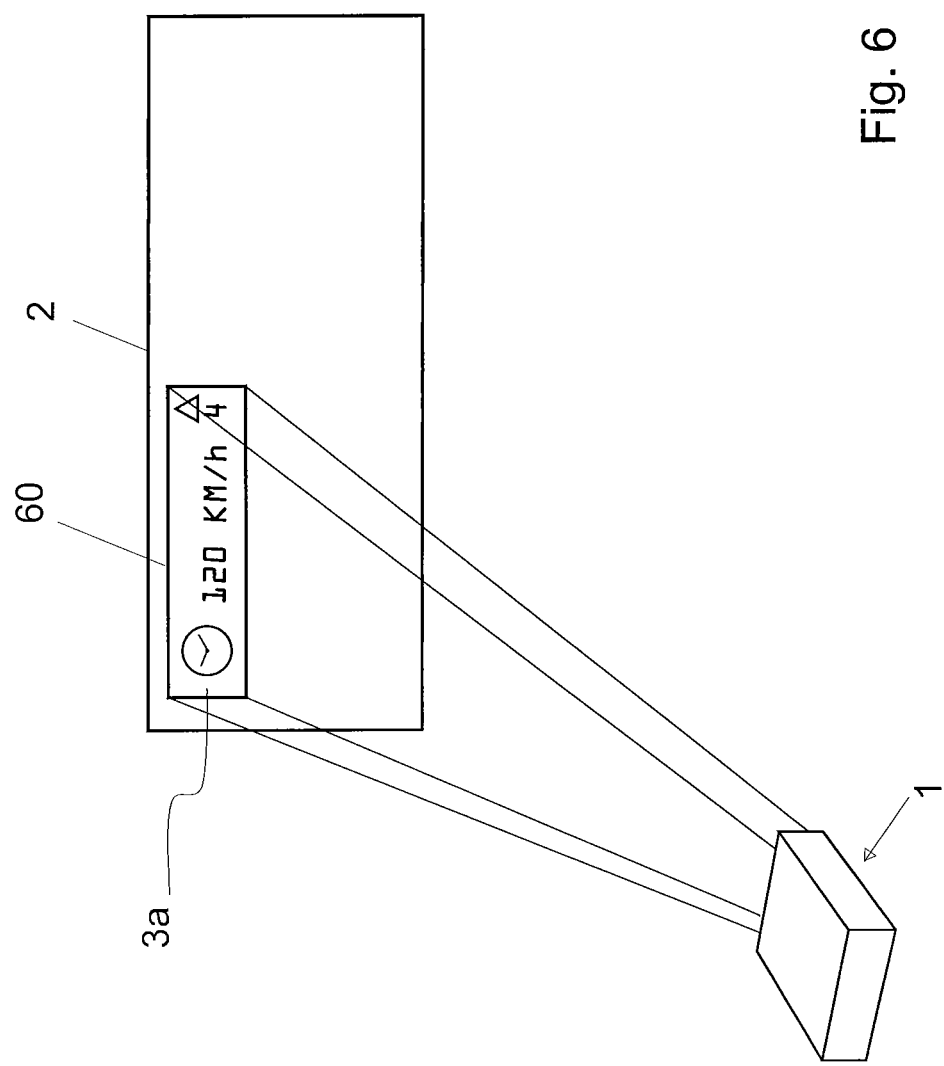
FIG. 6 illustrates the effect decreasing the amplitude of oscillations of the first and second mirror and applying an offset to an actuation signal which is used to actuate oscillation a first and second MEMS micro-mirror in the device of FIG. 1.

Additionally, an offset may be applied to the oscillations of the first and/or second MEMS micro-mirrors 5,7. This may be achieved by applying an offset (e.g. DC offset) to an actuation signal which is used to actuate oscillation of the first and second MEMS micro-mirrors 5,7. Applying an offset to the oscillations of the first and/or second MEMS micro-mirrors 5,7, will modify where in the display area 2 the first part 3a of the image 3 is projected. FIG. 6 illustrates the effect of applying an offset to the actuation signal which is used to actuate oscillation of the first MEMS micro-mirror 5. Thus, FIG. 6 illustrate the effect decreasing the amplitude of oscillations of the first and second mirror, as previously described, in addition to applying an offset to the actuation signal which is used to actuate oscillation of the first MEMS micro-mirror 5. As can be seen in FIG. 6, the position on the display area 2 where the first part 3a of the image 3 is projected is now moved vertically; so that the first part 3a of the image 3 is projected at a new position 60 in the display area 2. It will be understood that, additionally or alternatively, an offset could be applied to the actuation signal which is used to actuate oscillation of the second MEMS micro-mirror 7.

Figure 7:
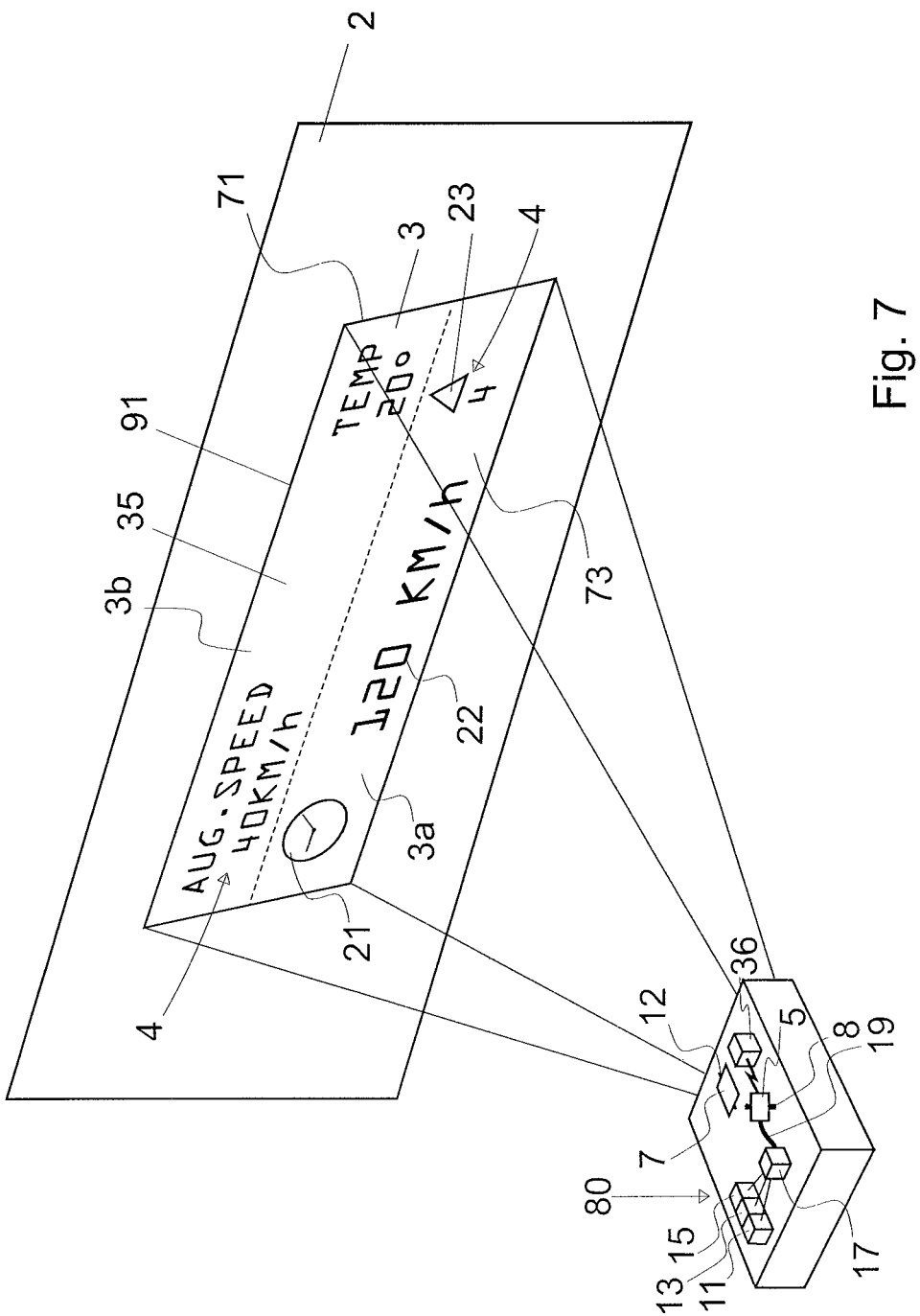
FIG. 7 provides a perspective view of a device according to a further embodiment of the present invention.

FIG. 7 illustrates a device 80 according to a further embodiment of the present invention. The device 80 has many of the same features of the device 1 shown in FIG. 1, and like features are awarded the same reference numerals. In this embodiment the image 3 to be projected by the device 1 comprises a plurality of pictograms 4 which are located in both the first part 3a and the second part 3b of the image 3. As with the device 1, the device 80 is configured to project an image 3 over a portion 91 of the display area 2.

In the device 80, the amplitude of oscillations of both the first and second MEMS micro-mirrors 5, 7 is adjusted. More specifically, the amplitude of oscillations of both the first and second MEMS micro-mirrors 5, 7, are decreased. This can be achieved by decreasing the amplitude of the actuation signal which actuates oscillation of the first and second MEMS micro-mirrors 5, 7. As the amplitude of oscillations of both the first and second MEMS micro-mirrors 5, 7, is decreased the light 19 from the beam combiner 17 will be scanned over a smaller area of the display area 2, and not over the whole area of the display area 2. As a result the image 3 will be reduced in size, but will remain projected towards the middle of the display area 2.

The light 19 provided by the beam combiner 17 is modulated such that the light 19 provided by the beam combiner 17 provides, consecutively, a first light signal which defines only pixels for the first part 3a of the image 3, followed by a second light signal which defines only pixels for the second part 3b of the image 3. As the first and second light signals are provided consecutively, the full amount of light which is available from the beam combiner 17 is used to form the first light signal; likewise the full amount of light which is available from the beam combiner 17 is used to form the second light signal.

The device 80 further comprises a means 36 for providing one or more offsets to an actuation signal which actuates oscillation of the second MEMS micro-mirror 7 and/or for providing one or more offsets to an actuation signal which actuates oscillation of the first MEMS micro-mirror 5. An offset could simply be a DC voltage or current applied to an actuation signal which actuates oscillation of a MEMS micro-mirror 5,7; for example, instead of applying +/−2V around a 0V axis, to the MEMS micro-mirror 5,7, a +/−2V around 1V axis is applied. Alternatively offset may be a physical offset. In the present example the means 36 provides a first offset and second offset, consecutively, to an actuation signal which actuates oscillation of the second MEMS micro-mirror 7, to ensure that device 80 projects over a first area 71 of the display area 2, when the first light signal is provided by the beam combiner 17, and to ensure that device 80 projects to a second area 73 of the display area 2, when the second light signal is provided by the beam combiner 17. The speed at which the first offset and second offset are consecutively applied to the actuation signal which actuates oscillation of the to the second MEMS micro-mirror 7, is such that it will appear to a viewer as if the first part 3a and second part 3b of the image 3 are simultaneously projected to the first and second areas 71, 73 respectively of the display area 2; thus a complete image 3 will be visible to the user. As the full amount of light which is available from the beam combiner 17 to project the first part 3a and second part 3b, consecutively, the image 3 will appear brighter.

It should be understood that the image 3 is not limited to having first part 3a and a second part 3b; an image 3 to be projected may be divided into any number of parts, and the number of parts into which an image is divided may be selected by a user or electronically based on the position and/or number of pictograms 4 in the image 3. For example, if the image 3 to be projected comprises four pictograms then the image 3 may be divided into four parts. For example, the image may comprise four parts, each of the four parts comprising a different pictogram 4 or a different set of pictograms. Thus, an image 3 may comprise any number of parts and an image 3 may have any number of pictograms 4. It should be understood that the four parts may be separate parts of the image 3 which do not directly cooperate with one another in the image; Preferably a parts of the image are defined as a plurality of rectangles; wherein the rectangles are the smallest rectangles around each pictogram in the image.

Likewise, the light 19 provided by the beam combiner 17 may be modulated to provide any number of light signals each of which define pixels of any number of parts of an image 3. For example, an image 3 may comprise four parts each of the four parts comprising a different pictogram 4; the light 19 provided by the beam combiner 17 may be modulated to provide, a first light signal which defines only pixels for a first part of the image 3, followed by a second light signal which defines only pixels for the second part of the image 3; followed by a third light signal which defines only pixels for a third part of the image 3; followed by a fourth light signal which defines only pixels for a fourth part of the image 3 etc.

A plurality of offsets may be consecutively applied to the actuation signals which actuates oscillation of the each of the first and second MEMS micro-mirrors 5,7. Typically the number of offsets will correspond to the number of parts into which the image 3 is divided. For example, if an image 3 is divided into four parts, four different offsets may be applied to each of the actuation signals which actuate oscillation of the each of the first and second MEMS micro-mirrors 5, 7, such that each of the four parts of the image 3 are projected to four different areas of the display area 2 e.g. such that each of the four parts of the image 3 are projected to each of the four corners of the display area 2. Preferably, the speed at which the offsets are applied to the actuation signals such that it will appear to a viewer as though that the four parts of the image 3 are projected simultaneously.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method of projecting a portion of an image comprising:
    modifying the amplitude of oscillations of a mirror of a projector to scan light a reduced distance in either a vertical direction or a horizontal direction to project over a portion of a display area, the portion of the display area less than a total area of the display area and the reduced distance less than a distance over which the projector can scan light in the vertical direction or the horizontal direction, the projector comprising the mirror, the mirror to scan light in at least one of the vertical direction or a horizontal direction, the modified amplitude to reduce a distance over which the projector scans light in either the vertical direction or the horizontal direction;
    receiving a signal which defines pixels of an image to be projected over the display area;
    modulating, at a signal processor, the signal to provide a modulated light signal which defines pixels of a portion of the image, the pixels of the portion of the image less than the pixels of the image; and
    projecting via the projector the portion of the image over the portion of the display area based on the modulated light signal and the modulated amplitude to improve a brightness of the projected portion of the image and to change an aspect ratio of the projected image.

2. The method according to claim 1, comprising providing one or more voltage offsets to the mirror to change a position onto which the portion of the image is projected.

3. The method according to claim 1, wherein configuring the projector to scan light a reduced distance comprises:
    modifying the amplitude of oscillations of a first mirror which oscillates to scan light in the horizontal direction to reduce the distance over which the projector scans light in the horizontal direction; and
    modifying the amplitude of oscillations of a second mirror which oscillates to scan light in the vertical direction to reduce the distance over which the projector scans light in the vertical direction.

4. The method according to claim 1, comprising consecutively projecting via the projector the portion of the image over the portion of the display area based on the modulated light signal.

5. The method according to claim 1, wherein modifying the signal to provide a modulated light signal which defines pixels of a portion of the image comprises removing at least one horizontal row of pixels or at least one vertical column of pixels.

6. A projection device comprising a means for configuring the device such that it projects over a portion of a display area;
    a means for receiving a signal which defines pixels of an image to be projected over a display area;
    a means for modulating the signal to provide a modulated light signal which defines pixels of a portion of the image, the pixels of the portion of the image less than the pixels of the image;
    a means for modifying the amplitude of oscillations of a mirror of a projection device to scan light a reduced distance in either a vertical direction or a horizontal direction to project the portion of the image over a portion of the display area to improve brightness of the projected portion of the image and to change an aspect ratio of the projected image, the portion of the display area less than a total area of the display area and the reduced distance less than a distance over which the device can scan light in the vertical direction or the horizontal direction.

7. The device according to claim 6, further comprising a means for providing an off-set to a mirror which oscillates to scan light over the display area, such that an image is projected at a selected portion of the display area.

8. The device according to claim 7, wherein the means for providing an off-set further comprises a means for consecutively providing a plurality off-sets to a mirror which oscillates to scan light, so that images can be consecutively projected to different portions of the display area.

9. The device according to claim 6, wherein the device comprises one or multiple UV light sources, and wherein the device is arranged to cooperate with a surface which defines a display area, wherein the surface which defines a display area comprises a means to absorb the light from the UV light source to display an image, and to re-emit visible light.

10. The device according to claim 6, being provided in an automobile comprising and wherein the display area is defined by a windshield or windscreen of the automobile.

11. The device according to claim 6, being provided in a projection system, the projection system comprising,
the device being coupled with one or more sensors which are configured to sense a field of view of a user, and
a processing unit in operable communication with the device to configure the device to project a portion of an image of the field of view sensed by the one or more sensor.

12. A system comprising:
a signal processor to modulate a signal to provide a modulated light signal, the signal to define pixels of an image and the modulated light signal to define pixels of a portion of the image, the pixels of the portion of the image less than the pixels of the image;
a projector comprising:
a light source to emit a light beam defining the modulated light signal;
a first microelectromechanical system (MEMS) mirror to receive the light beam and oscillate to scan the light beam in a first direction; and
a second MEMS mirror to receive the light beam and oscillate to scan the light beam in a second direction perpendicular to the first direction; and
a controller to:
reduce a distance over which at least one of the first MEMS mirror or the second MEMS mirror scans the light beam to project the portion of the image over a portion of a display area to improve brightness of the projected portion of the image, the reduced distance less than a distance over which the at least one of the first MEMS mirror or the second MEMS mirror can scan light in the first direction or the second direction; and
modify the amplitude of oscillation of either the first MEMS mirror or the second MEMS mirror to change an aspect ratio of the projected portion of the image.

13. The system of claim 12, the light source to consecutively emit the light beam defining the modulated light signal.

14. The system of claim 12, the controller to add one or more voltage offsets to the modulated signal to change a position on the display area onto which the portion of the image is projected.

15. The system of claim 12, the modulator to remove at least one horizontal row of pixels or at least one vertical column of pixels from the image to modify the signal to provide the modulated light signal.

* * * * *